US012046846B2

(12) United States Patent
Zhou et al.

(10) Patent No.: US 12,046,846 B2
(45) Date of Patent: Jul. 23, 2024

(54) PLUG-IN CONTACT ASSEMBLY SUITABLE FOR AUTOMATIC TRANSFER SWITCH

(71) Applicant: Schneider Electric Industries SAS, Rueil-Malmaison (FR)

(72) Inventors: Junjie Zhou, Shanghai (CN); Xi Xie, Shanghai (CN); Bo Wang, Shanghai (CN); Xiaoqin Wang, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 165 days.

(21) Appl. No.: 17/726,841

(22) Filed: Apr. 22, 2022

(65) Prior Publication Data

US 2022/0344851 A1 Oct. 27, 2022

(30) Foreign Application Priority Data

Apr. 23, 2021 (CN) ......................... 202120856494.9

(51) Int. Cl.
*H01R 13/02* (2006.01)
*H01R 13/187* (2006.01)
*H01R 43/02* (2006.01)

(52) U.S. Cl.
CPC ........... *H01R 13/187* (2013.01); *H01R 43/02* (2013.01)

(58) Field of Classification Search
CPC ...... H01R 13/187; H01R 13/15; H01R 13/17; H01R 13/18; H01R 13/2435; H01R 43/02
See application file for complete search history.

(56) References Cited

U.S. PATENT DOCUMENTS 4,916,421 A * 4/1990 Pardini .................... H01H 1/18 335/185
5,313,180 A * 5/1994 Vial ........................ H01H 1/205 218/31
5,357,066 A * 10/1994 Morel .................. H01H 71/002 200/17 R
6,114,641 A * 9/2000 Castonguay ........... H01H 1/205 200/17 R
6,232,570 B1 * 5/2001 Castonguay ............. H01H 9/46 200/237

(Continued)

FOREIGN PATENT DOCUMENTS

| | | |
|---|---|---|
| CN | 110391095 B | 8/2020 |
| EP | 2674951 A1 | 12/2013 |
| WO | 2014170528 A1 | 10/2014 |

OTHER PUBLICATIONS

Extended European Search Report dated Sep. 9, 2022 for corresponding European Patent Application No. 22305595.5-1201, 7 pages.

*Primary Examiner* — Harshad C Patel
(74) *Attorney, Agent, or Firm* — Locke Lord LLP

(57) ABSTRACT

A plug-in contact assembly suitable for automatic transfer switches includes a contact holder, two moving contact pieces disposed apart from each other, a moving contact piece bracket and a biasing spring; the contact holder holds the moving contact piece bracket and the biasing spring therein; and the two moving contact pieces disposed apart from each other are held in place relative to the contact holder under the joint action of the biasing spring and the moving contact piece bracket; characterized in that, two ends of each moving contact piece are each provided with a moving contact thereon by means of welding.

9 Claims, 6 Drawing Sheets

(56) References Cited

U.S. PATENT DOCUMENTS

| | | | | |
|---|---|---|---|---|
| 6,232,856 | B1 * | 5/2001 | Boucher | H01H 1/2058 335/16 |
| 6,326,868 | B1 * | 12/2001 | Kranz | H01H 1/205 335/8 |
| 6,396,369 | B1 * | 5/2002 | Schlitz | H01H 1/205 335/147 |
| 6,403,901 | B1 * | 6/2002 | Boeder | H01H 1/2041 200/244 |
| 6,639,168 | B1 * | 10/2003 | Castonguay | H01H 3/60 335/46 |
| 6,791,440 | B2 * | 9/2004 | Harmon | H01H 1/205 218/156 |
| 6,965,292 | B2 * | 11/2005 | Ciarcia | H01H 1/205 200/243 |
| 7,005,594 | B2 * | 2/2006 | Kim | H01H 1/205 200/244 |
| 7,189,935 | B1 * | 3/2007 | Hassan | H01H 1/205 200/244 |
| 7,221,246 | B2 * | 5/2007 | Rajauria | H01H 1/205 335/16 |
| 7,977,592 | B2 * | 7/2011 | Shmukler | H01H 77/104 200/244 |
| 8,071,898 | B2 * | 12/2011 | Bennett | H01H 1/205 218/31 |
| 8,089,016 | B2 * | 1/2012 | Dahl | H01H 77/104 200/400 |
| 8,497,752 | B2 * | 7/2013 | An | H01H 1/205 335/16 |
| 9,293,271 | B2 * | 3/2016 | Biedunkiewicz | H01H 1/205 |
| 9,704,675 | B2 * | 7/2017 | Liu | H01H 73/045 |
| 9,842,708 | B1 * | 12/2017 | Tumu | H01H 1/205 |
| 11,193,976 | B2 * | 12/2021 | Vuorinen | G01R 1/04 |

* cited by examiner

PLUG-IN CONTACT ASSEMBLY SUITABLE FOR AUTOMATIC TRANSFER SWITCH

TECHNICAL FIELD

The present disclosure relates to a plug-in contact assembly suitable for automatic transfer switches.

BACKGROUND

In the prior art, the plug-in contact assembly basically adopts a method in which copper pieces are punched and then the contact parts are directly plated with silver. When using the silver-plating process, it is not easy to control the size and material composition of the contacts, and the bonding firmness of the silver plating is not high, thus the electrical performance is poor and unstable. In the prior art, the electrical life of the plug-in contact assembly is only about 2,000 times, and for the original solution, there always exist fusion welding situations in the tests, which cause the automatic transfer switch unable to be opened.

SUMMARY

In order to solve one or more defects in the prior art, a new plug-in contact assembly is needed, which can greatly improve the wear resistance of the contacts and can have excellent electrical performance by means of adjustment in the shape of the moving contact pieces, special silver point welding and overtravel control.

According to one aspect of the present disclosure, a plug-in contact assembly suitable for automatic transfer switches is proposed, which includes a contact holder, two moving contact pieces disposed apart from each other, a moving contact piece bracket and a biasing spring.

The contact holder holds the moving contact piece bracket and the biasing spring therein.

Under the joint action of the biasing spring and the moving contact piece bracket, the two moving contact pieces disposed apart from each other are held in place relative to the contact holder.

Two ends of each said moving contact piece are each provided with a moving contact through welding.

According to the above-mentioned aspects of the present disclosure, two ends of each moving contact piece are each provided with a moving contact recess.

The moving contacts are mounted in the moving contact recesses through welding. The bonding force between the moving contacts and the moving contact pieces can be enhanced through the welding process.

According to the above-mentioned aspects of the present disclosure, the moving contacts have a flat disc shape.

The moving contact recesses have a circular shape.

According to the above-mentioned aspects of the present disclosure, the moving contacts have a planar top surface, an eccentric cylindrical base, and an annular arc surface connected between the top surface and the base. This structure facilitates the insertion of a stationary contact (not shown) between two moving contacts.

According to the above-mentioned aspects of the present disclosure, the moving contact pieces have a first surface of the moving contact piece.

The top surface of the moving contact is higher than the first surface of the moving contact piece, thereby controlling the overtravel of the plug-in contact assembly, that is, the overtravel control.

According to the above-mentioned aspects of the present disclosure, the base of the moving contact is located in the moving contact recess.

The arc surface of the moving contact is higher than the first surface of the moving contact piece.

According to the above-mentioned aspects of the present disclosure, the moving contact recesses are open recesses, so that a step in a partial arc shape is formed between the bottom surface of the moving contact recess and the first surface of the moving contact piece.

By setting the size (e.g., depth, etc.) of the moving contact recesses and the size (e.g., thickness, etc.) of the moving contacts, different overtravel requirements can be flexibly adapted.

According to the above-mentioned aspects of the present disclosure, the moving contacts are made into a flat disk shape using a material including silver.

According to the above-mentioned aspects of the present disclosure, the moving contacts are made into a flat disk shape using silver tin-oxide with indium oxide.

According to the above-mentioned aspects of the present disclosure, the moving contacts provided on both ends of one of the moving contact pieces are respectively arranged opposite to the moving contacts provided on both ends of the other moving contact piece and are separate from each other.

According to the plug-in contact assembly disclosed by the present disclosure, the wear resistance and excellent electrical performance of the contacts are greatly improved by means of adjustment on the shape of the moving contact piece, special silver point welding process and overtravel control.

The new plug-in contact assembly can prolong the electrical life from the original about 2,000 times to 6,000 times or even longer, and after the new plug-in contact assembly is adopted, the fusion welding situation is appreciably solved.

So far, in order that the detailed description of the present disclosure herein can be better understood, and that the contribution of the present disclosure to the prior art can be better recognized, the disclosure has outlined its contents quite extensively. Of course, the embodiments of the present disclosure will be described below and will form the subject of the appended claims.

Likewise, those skilled in the art will realize that the concept on which the present disclosure is based can be easily used as a basis for designing other structures, methods and systems for implementing several purposes of the present disclosure. Therefore, it is important that the appended claims should be considered to include such equivalent structures as long as they do not exceed the spirit and scope of this disclosure.

BRIEF DESCRIPTION OF THE DRAWINGS

The present disclosure will be better understood by those skilled in the art through the following drawings, which reflect the advantages of the present disclosure more clearly. The drawings described here are only for illustrative purposes of selected embodiments, not all possible embodiments, and are intended not to limit the scope of the present disclosure.

DETAILED DESCRIPTION OF THE EMBODIMENTS

The specific embodiments according to the present disclosure will be explained in detail with reference to the following figures.

Figure 1:
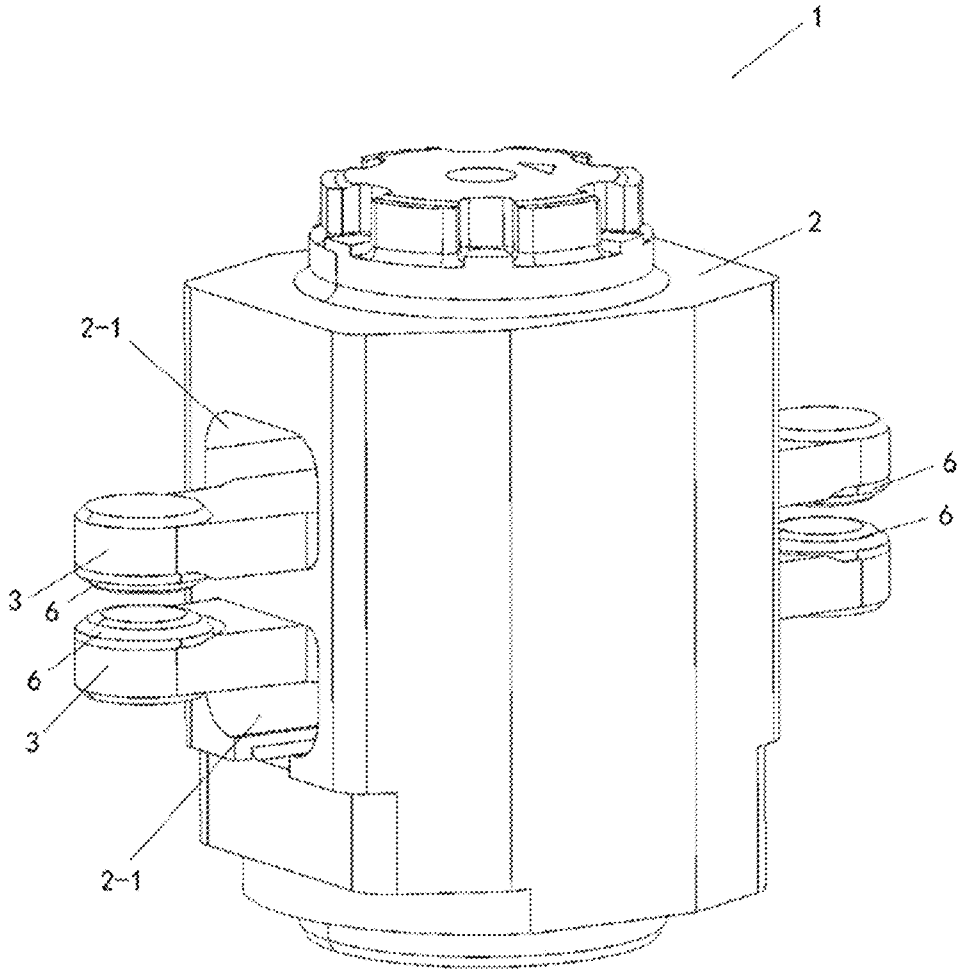
FIG. 1 shows an assembled perspective view of a plug-in contact assembly according to the present disclosure.
Figure 2:
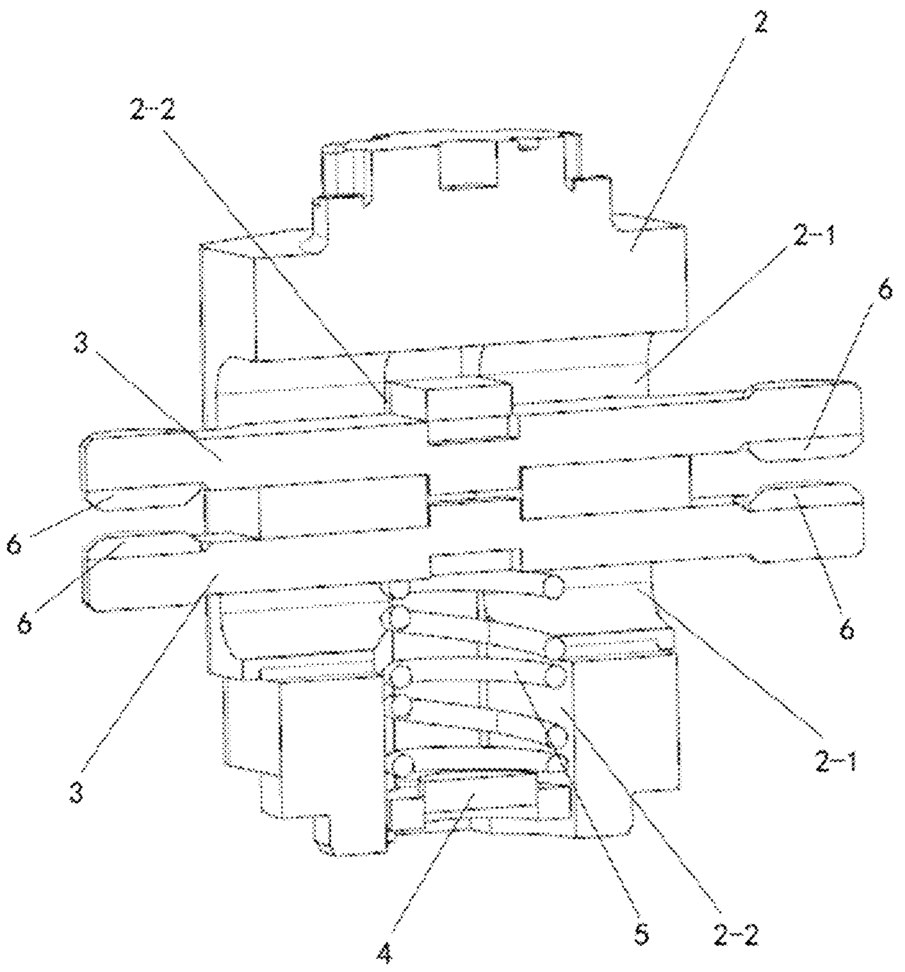
FIG. 2 shows an assembled cross-sectional view of a plug-in contact assembly according to the present disclosure.

As shown in FIGS. 1 and 2, according to one embodiment of the present disclosure, a plug-in contact assembly 1 suitable for automatic transfer switches is proposed. The plug-in contact assembly 1 comprises a contact holder 2, two moving contact pieces 3 disposed apart from each other, a moving contact piece bracket 4 and a biasing spring 5.

The contact holder 2 holds the moving contact piece bracket 4 and the biasing spring 5 therein.

Under the joint action of the biasing spring 5 and the moving contact piece bracket 4, the two moving contact pieces 3 disposed apart from each other are held in place relative to the contact holder 2.

Two ends of each said moving contact piece 3 are each provided with a moving contact 6 thereon through welding.

Figure 3:
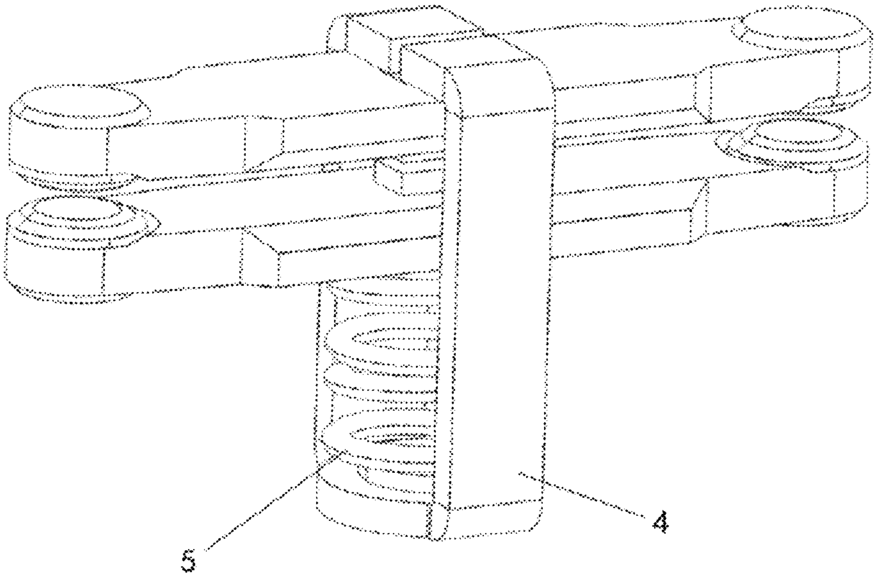
FIG. 3 shows an assembly diagram of two moving contact pieces disposed apart from each other, a moving contact piece bracket and a biasing spring of a plug-in contact assembly according to the present disclosure, in which a contact holder is omitted.
Figure 4:
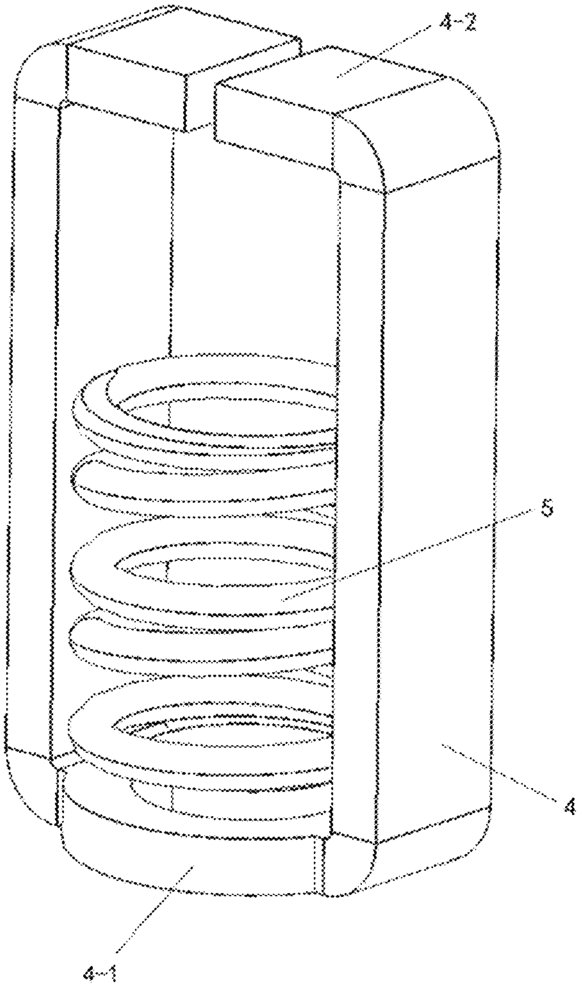
FIG. 4 shows an assembly diagram of a moving contact piece bracket and a biasing spring of a plug-in contact assembly according to the present disclosure.

As shown in FIGS. 2 to 4, two moving contact piece through holes 2-1 are provided in the contact holder 2, and the two moving contact pieces 3 are held in the corresponding moving contact piece through holes 2-1, respectively.

One end of the biasing spring 5 is held on the bottom 4-1 of the moving contact piece bracket 4, and the other end of the biasing spring 5 presses against one of the moving contact pieces 3 in one of the moving contact piece through holes 2-1.

The top 4-2 of the moving contact piece bracket 4 presses against the other moving contact piece 3 in the other moving contact piece through hole 2-1.

The contact holder 2 is also provided with a moving contact piece bracket holding part 2-2 therein, and the moving contact piece bracket 4 and the biasing spring 5 are held in the moving contact piece bracket holding part 2-2. The moving contact piece bracket holding part 2-2 is arranged perpendicular to the moving contact piece through holes 2-1 and is in communication with the moving contact piece through holes 2-1 respectively.

Figure 5:
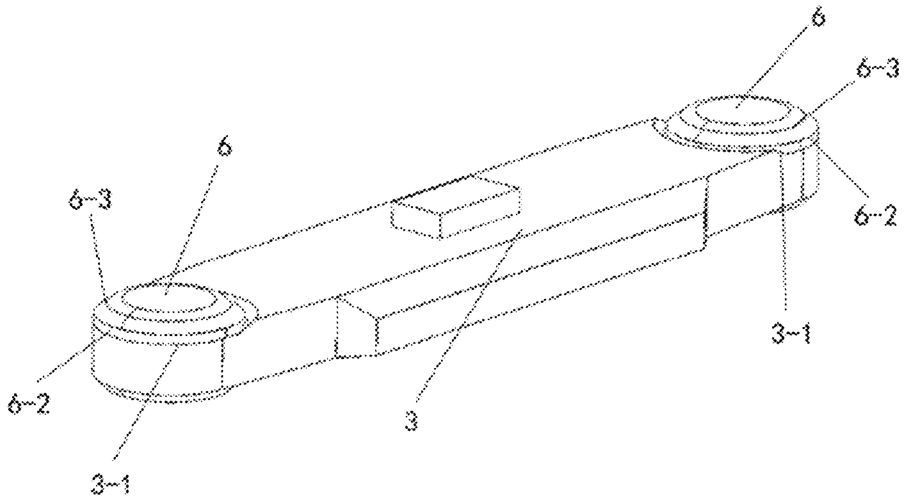
FIG. 5 shows an assembly diagram of a moving contact piece and a moving contact of a plug-in contact assembly according to the present disclosure.
Figure 6:
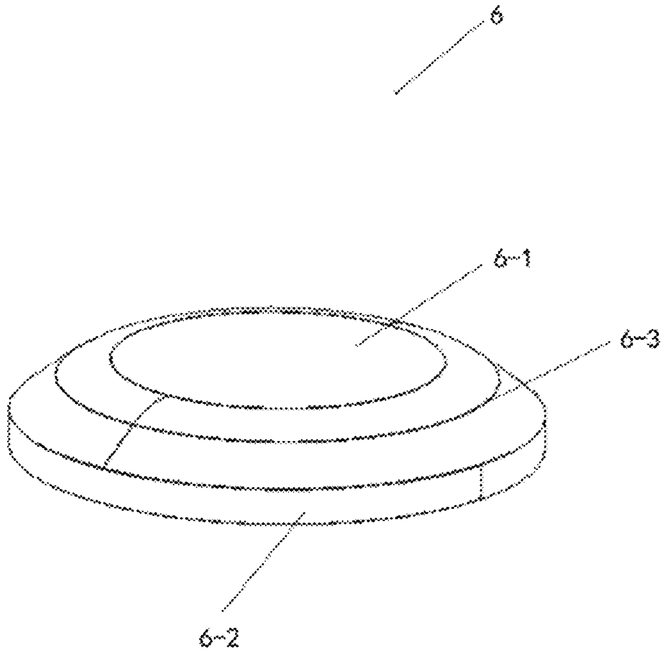
FIG. 6 shows a moving contact of a plug-in contact assembly according to the present disclosure.
Figure 7:
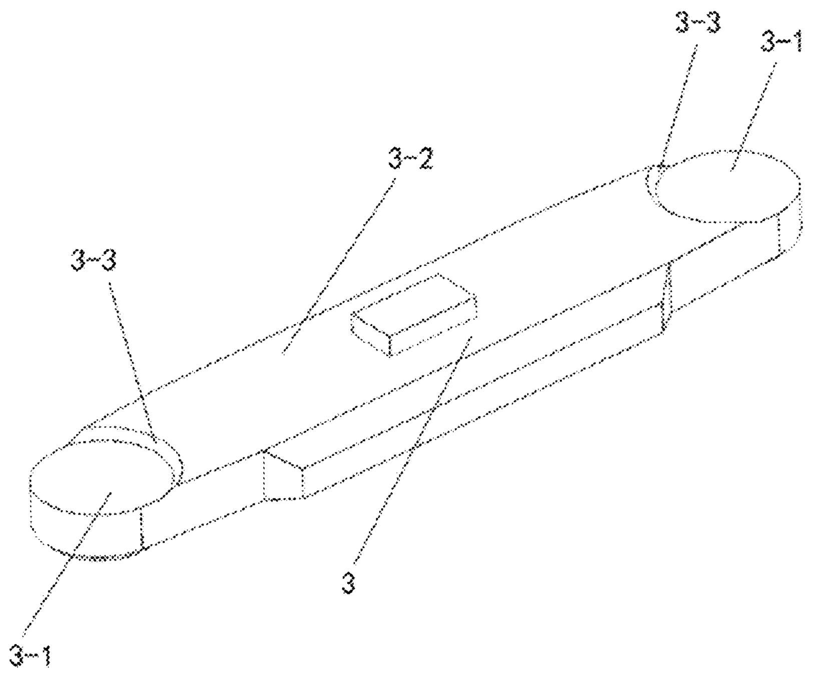
FIG. 7 shows a moving contact piece of a plug-in contact assembly according to the present disclosure.

As shown in FIGS. 5 to 7, according to the above-mentioned embodiments of the present disclosure, two ends of each moving contact piece 3 are each provided with a moving contact recess 3-1 thereon. The moving contact pieces are made through stamping process.

The moving contacts 6 are mounted in the moving contact recesses 3-1 by welding. The bonding force between the moving contacts 6 and the moving contact pieces 3 can be enhanced by the welding process.

According to the above-mentioned embodiments of the present disclosure, as shown in FIG. 6, the moving contact 6 has a flat disc shape.

The moving contact recess 3-1 has a circular shape.

According to the above-mentioned embodiments of the present disclosure, the moving contact 6 has a planar top surface 6-1, an eccentric cylindrical base 6-2, and an annular arc surface 6-3 connected between the top surface 6-1 and the base 6-2. This structure facilitates the insertion of a stationary contact (not shown) between two moving contacts.

According to the above-described embodiments of the present disclosure, the moving contact piece 3 has a first surface 3-2 of the moving contact piece.

The top surface 6-1 of the moving contact 6 is higher than the first surface 3-2 of the moving contact piece, so as to control the overtravel of the plug-in contact assembly, that is, the overtravel control.

According to the above-mentioned embodiments of the present disclosure, the base 6-2 of the moving contact 6 is located in the moving contact recess 3-1.

The curved surface 6-3 of the moving contact 6 is higher than the first surface 3-2 of the moving contact piece.

According to the above-mentioned embodiments of the present disclosure, as shown in FIG. 7, the moving contact recess 3-1 is an open recess, so that a step 3-3 with a partial arc shape is formed between the bottom surface of the moving contact recess 3-1 and the first surface 3-2 of the moving contact piece.

By setting the size (e.g., depth, etc.) of the moving contact recesses 3-1 and the size (e.g., thickness, etc.) of the moving contacts 6, different overtravel requirements can be flexibly adapted.

According to the above-mentioned embodiments of the present disclosure, the moving contact 6 is made into a flat disk shape using a material including silver.

According to the above-mentioned embodiments of the present disclosure, the moving contact 6 is made into a flat disk shape using silver tin-oxide with indium oxide.

According to the above-mentioned embodiments of the present disclosure, the moving contacts 6 provided on both ends of one of the moving contact pieces 3 are respectively arranged opposite to the moving contacts 6 provided on both ends of the other moving contact piece 3 and are separate from each other.

According to the plug-in contact assembly of the present disclosure, the silver plating process is avoided. By arranging separate moving contacts, the size and material composition of the moving contact can be set flexibly to meet the needs of different electrical properties. Further, the moving contacts are installed in the moving contact recesses by welding, which can enhance the bonding force between the moving contact and the moving contact piece. The new plug-in contact assembly can prolong the electrical life from the original about 2,000 times to 6,000 times or even longer, and after the new plug-in contact assembly is adopted, the fusion welding situation is appreciably solved.

The foregoing disclosure provides illustration and description, but it is not intended to be exhaustive or to limit the embodiments to the precise form disclosed. Modifications and variations can be made in light of the above disclosure, or can be acquired from the practice of the embodiments.

Even though specific combinations of features are recited in the claims and/or disclosed in the specification, these combinations are not intended to limit the disclosure of various embodiments. Actually, many of these features can be combined in ways not specifically stated in the claims and/or not specifically disclosed in the specification. Although each dependent claim listed below may directly depend on only one claim, the disclosure of various embodiments includes each dependent claim combined with each other claim in the claim set.

Unless explicitly stated, no element, action or instruction used herein should be interpreted as critical or necessary. In addition, as used herein, the articles "a" and "an" are intended to include one or more items and can be used interchangeably with "one or more". Furthermore, as used herein, the article "the" is intended to include one or more items cited in connection with the article "the" and can be used interchangeably with "one or more". Furthermore, as used herein, the term "set" is intended to include one or more items (e.g., related items, unrelated items, combinations of related and unrelated items, etc.) and can be used interchangeably with "one or more". When only one item is intended, the phrase "only one" or a similar phrase is used. In addition, as used herein, the term "have" and its variants are intended to be open-ended terms. In addition, the phrase "based on" is intended to mean "at least partially based on", unless otherwise explicitly stated. In addition, as used herein, the term "or" is intended to be inclusive when used in series, and can be used interchangeably with "and/or", unless otherwise explicitly stated (for example, if used in combination with "or" or "only one of them").

What is claimed is:

1. A plug-in contact assembly suitable for automatic transfer switches, the plug-in contact assembly comprising a contact holder, two moving contact pieces disposed apart from each other, a moving contact piece bracket and a biasing spring;

the contact holder holding the moving contact piece bracket and the biasing spring therein;

the two moving contact pieces disposed apart from each other being held in place relative to the contact holder under the joint action of the biasing spring and the moving contact piece bracket;

characterized in that, two ends of each said moving contact piece are each provided with a moving contact by means of welding, and wherein the moving contacts have a planar top surface, an eccentric cylindrical base and an annular arc surface connected between the top surface and the base.

2. The plug-in contact assembly according to claim 1, characterized in that two ends of each said moving contact piece are each provided with a moving contact recess;

the moving contacts are mounted in the moving contact recesses by means of welding.

3. The plug-in contact assembly according to claim 2, characterized in that the moving contacts have a flat disk shape;

the moving contact recesses have a circular shape.

4. The plug-in contact assembly according to claim 1, characterized in that the moving contact piece is provided with a first surface of the moving contact piece;

the top surface of the moving contact is higher than the first surface of the moving contact piece, thereby controlling the overtravel of the plug-in contact assembly.

5. The plug-in contact assembly according to claim 4, characterized in that the base of the moving contact is located in the moving contact recess;

the arc surface of the moving contact is higher than the first surface of the moving contact piece.

6. The plug-in contact assembly according to claim 4, characterized in that the moving contact recess is an open recess, so that a step in the shape of a partial arc is formed between the bottom surface of the moving contact recess and the first surface of the moving contact piece.

7. The plug-in contact assembly according to claim 4, characterized in that the moving contacts are made into a flat disk shape using a material including silver.

8. The plug-in contact assembly according to claim 4, characterized in that the moving contact is made into a flat disk shape using silver tin-oxide with indium oxide.

9. The plug-in contact assembly according to claim 1, characterized in that the moving contacts provided on both ends of one of the moving contact pieces are respectively arranged opposite to the moving contacts provided on both ends of the other moving contact piece and are separate from each other.

* * * * *